Figure 1:
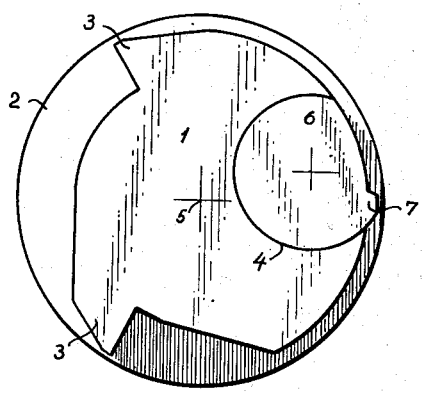

June 21, 1955 K. B. JENSEN 2,711,107
ADJUSTABLE REAMER
Filed July 21, 1952

Kaj Björn Jensen
Inventor
By Sol Shappirio, Atty.

United States Patent Office 2,711,107
Patented June 21, 1955

2,711,107
ADJUSTABLE REAMER
Kaj Björn Jensen, Glostrup, Denmark

Application July 21, 1952, Serial No. 299,974

Claims priority, application Sweden July 23, 1951

3 Claims. (Cl. 77—75)

This invention relates to an adjustable reamer.

A reamer has often to be ground after relatively short use. By the grinding, the original dimensions of the reamer are reduced, wherefore it has to be ground down to the next current dimension. Accordingly it will be unfit for use after relatively few grindings.

Different types of adjustable reamers have been proposed in order to evade this drawback. The best known embodiment of such adjustable reamers has detachable cutting edges which are lengthwise displaceable in grooves in the body of the reamer and are moved outwards to an ever greater diameter by displacement upwards along inclined tracks forming the bottom of the grooves. However, these reamers have several drawbacks. Thus the body of the reamer is weakened by the grooves and the cutting edges are displaced and fixed in the desired position by nuts which must be very thin. Furthermore, cuttings are often jammed beneath the cutting edges, and the reamer, which is often provided with five edges, will not then be round. Finally it is almost inevitable that to some extent the cutting edges capsize in the grooves, whereby the reamer cuts more than intended.

Some of these drawbacks are avoided in another embodiment of adjustable reamers which has formerly been proposed, viz. the expandable reamer. In this reamer the cutting plane, in which the cutting edges are formed, is shaped as a tube, which is partly slotted and may be brought to expansion by mutually displacing conical and wedge-shaped parts within the tube. Such expandable reamers, however, are only very slightly adjustable, and by the expansion they become recognizably barrelshaped.

It is an object of the invention to provide an adjustable reamer by which the said drawbacks are avoided. To this end the reamer according to the invention has in addition to two firm cutting edges, a blunt guiding edge, the position of which latter is adjustable in respect of the axis of the reamer.

By the reamer according to the invention having only three edges, it is ensured that two of them will always remove a suitable cutting, and since three points can always be inscribed in a circle, no out-of-round will occur as in the case of adjustable reamers with more than three cutting edges, and the drawbacks of the latter are accordingly avoided. The adjustment of the blunt guiding edge is easy to perform, and a large variability can be obtained.

The adjustment of the blunt guiding edge may be performed by means of the kind which are known for adjustment of the cutting edges in the known adjustable reamers. Since the edge is blunt, it may easily be shaped so that no disadvantage is involved by its capsizing and since only one such blunt edge is provided, the reamer is not weakened to any noticeable degree. Further nuts, which encircle the reamer and accordingly must be very thin, are unnecessary since the adjustment may be carried out by means of screws for which ample space is available, or in other wise.

According to an embodiment of the invention it is particularly expedient to fashion the blunt guiding edge on an otherwise circular cylindrical rod which may be revolved in an undercut, outwardly open, cylindrical groove in the body of the reamer, parallel to the axis and at some distance from the latter so that the blunt edge can be adjusted at different distances from the axis of the reamer by revolving the rod in the groove.

Thus the adjusting is easy to perform and cuttings cannot jam behind the rod.

To make the revolving possible, a groove may be provided in the end of the rod, so that the latter may be turned by means of a screw driver fitted into said groove. However, in certain cases it may be expedient to provide separate means for fixing the rod in a suitable position and, according to an appropriate embodiment of the invention, these means can be such which themselves serve for revolving the rod. To this end said rod may be provided on its surface with one or two circular, toothed grooves at right angles to the axis and correspondingly, one or two screws may be provided in the body of the reamer, engaging the teeth in the grooves of the rod. If two screws are used, they must be prevented from displacement in one lengthwise direction, for instance by the end of the screws abutting against the bottom of the bore in which they are placed. If only one screw is provided, it must in known manner be prevented from displacement in both directions. By this means a careful adjustment of the reamer is very easy to carry out. Adjustment may safely cover such range that the reamer, if desired, can be used for reaming different dimension of holes.

The reamer can be used manually as well as mechanically. The excentricity appearing by the adjustment has proved to be without importance because of the good guidance of the reamer in the hole to be reamed.

In the following, the invention will be described with reference to the drawings, showing a preferred embodiment of an adjustable reamer.

Figure 5:
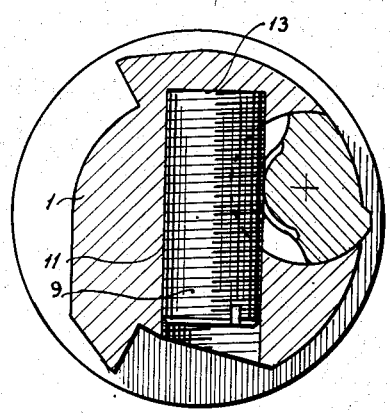
Figure 2:
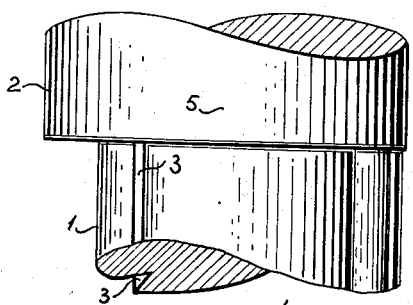
Figure 4:
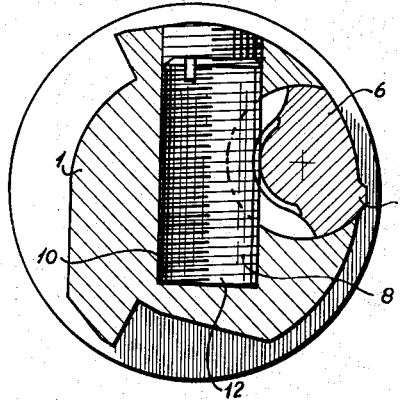
Figure 4:
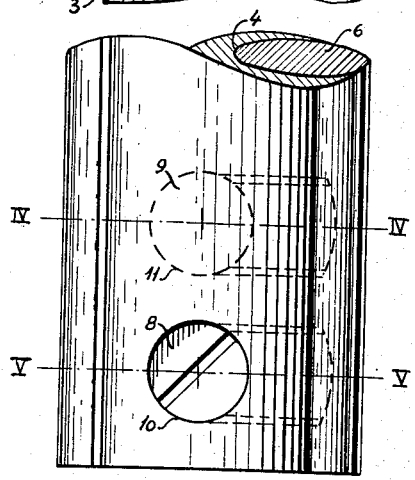
Figure 3:
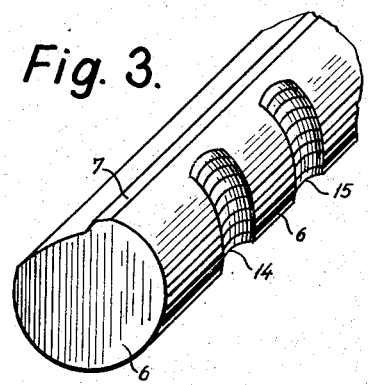

Figure 1 shows the reamer from the end, and
Figure 2 shows the same reamer from the side.
Figure 3 is a perspective view of a detail.
Figure 4 is a section along line IV—IV in Figure 2, and
Figure 5 is a section along the line V—V, also in Figure 2.

The embodiment shown and described should, however, only be taken as an example, in no manner limiting to the invention.

In the drawing 1 is the body of the reamer, and 2 is part of its shank. In the body firm edges 3 are provided. In a cylindrical, outwardly open, undercut groove 4, bored in the body 1 and parallel to the axis 5 of the reamer, a rod 6 is provided, the surface of which is substantially cylindrical and fits closely in the groove 4. The position of the rod 6 is such that if the cylindrical surface had been unbroken, it would not only have protruded beyond the body, but also beyond a circle having its centre in the axis 5 and containing the edges of the firm cutting edges. However, the part of the rod 6, which would thus protrude beyond the body 1, is cut away except for a blunt edge 7, which in the normal or starting position as shown is just at the same distance from the axis 5 as the cutting edges 3.

By rotating the rod 6, the edge 7 can be adjusted to be at a smaller or greater distance from the axis 5. Thereby the diameter of the opening, which can be made by the reamer, may be varied without such variation being detrimental in any manner to the guiding or cutting and without any other disadvantages being recognizable.

In the embodiment shown in the drawings, the rod 6 is revolved by means of screws 8 and 9, which are displaceable in bores 10 and 11 in the body of the reamer at right angles to the axis of the latter. The screws 8 and 9 cooperate with teeth cut in grooves 14 and 15 in the surface of the rod 6, as shown in Figure 3.

By loosening the screw 9 so that its end is removed some way from the bottom 13 of the bore 11 and then tightening screw 8 so that it presses against the bottom 12 of the bore 10, the rod is revolved so that the blunt guiding edge 7 retreats to a smaller diameter, and vice versa the blunt guiding edge may be advanced to a larger diameter by loosening the screw 8 and tightening the screw 9. By tightening the screw 8 as well as the screw 9 against the bottom of their respective bores, the rod 6 is fixed in its position.

I claim:

1. An adjustable reamer comprising only two firm cutting edges and a blunt, guiding edge substantially equidistant from each other, the guiding edge being an edge on an otherwise circular cylindrical rod, which is rotatable in an outwardly open, undercut cylindrical groove, whose axis is parallel to the axis of the reamer itself, and whose position in the body of the reamer is such that on revolving said rod in said groove, the distance between the blunt edge and the axis of the reamer can be adjusted to be greater, equal to or smaller than the distance between any of the firm cutting edges of said axis.

2. An adjustable reamer as set forth in claim 1, in which a toothed groove is provided in the surface of said rod at right angles to its axis, and a screw is provided in the body of the reamer to cooperate with said toothed groove, said screw being rotatable, but not lengthwise displaceable.

3. An adjustable reamer as set forth in claim 1, in which two screws are provided for revolving said rod, said screws engaging mating teeth in grooves in the surface of said rod at right angles to its axis, and each screw being lengthwise displaceable only in one direction opposite to the lengthwise displaceability of the other screw.

References Cited in the file of this patent
UNITED STATES PATENTS

| | | |
|---|---|---|
| 979,809 | Studer | Dec. 27, 1910 |
| 1,234,003 | Frick | July 17, 1917 |
| 1,585,656 | Ewell et al. | May 25, 1926 |